United States Patent [19]
Groves et al.

[11] Patent Number: 4,850,016
[45] Date of Patent: Jul. 18, 1989

[54] MICROPHONE

[75] Inventors: Ronald J. Groves, Brighton; Keith T. Lambell, Maidstone, both of England

[73] Assignee: Crystalate Electronics Limited, Tonbridge, England

[21] Appl. No.: 150,126

[22] Filed: Jan. 29, 1988

[30] Foreign Application Priority Data

Jan. 29, 1987 [GB] United Kingdom ............... 8702037

[51] Int. Cl.$^4$ .............................................. H04M 1/19
[52] U.S. Cl. .................................. 379/433; 381/155; 381/157
[58] Field of Search ............... 379/433; 381/157, 155, 381/169, 188, 158, 154, 150, 156

[56] References Cited

U.S. PATENT DOCUMENTS

| | | | |
|---|---|---|---|
| 2,607,857 | 8/1952 | Baker | 379/433 |
| 4,281,222 | 7/1981 | Nakagawa et al. | 381/158 X |
| 4,319,095 | 3/1982 | Cogan | 379/433 |
| 4,463,222 | 7/1984 | Poradowski | 381/155 |

FOREIGN PATENT DOCUMENTS 1199138 1/1986 Canada ............... 379/433

Primary Examiner—Jin F. Ng
Assistant Examiner—Randall S. Vaas
Attorney, Agent, or Firm—Pollock, Vande Sande & Priddy

[57] ABSTRACT

A noise cancelling microphone for location inside an apertured mouthpiece region of a telephone handset comprises a housing with a face for securement in contact with the inside of the mouthpiece region. A cavity accommodates a vibratable diaphragm. A first sound path is provided to a front surface of the diaphragm by way of an opening in a central region of the face of the housing and apertures in a central portion of the mouthpiece region of the handset. A second sound path, physically separated from the first, is provided to a rear surface of the diaphragm by way of an opening in an outer region of the face of the housing and apertures in an outer portion of the mouthpiece region. The separated sound paths are extended by securing an upstanding member, such as a hollow truncated cone, externally on the mouthpiece region to separate the central and outer apertures.

6 Claims, 1 Drawing Sheet

U.S. Patent   Jul. 18, 1989   4,850,016
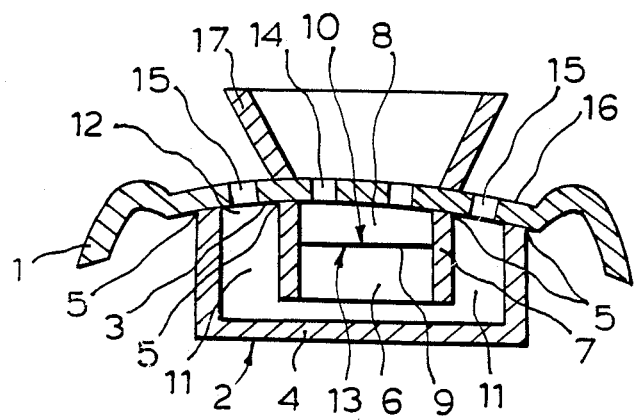

MICROPHONE

FIELD OF THE INVENTION

This invention relates to microphones and more particularly to a noise cancelling microphone for use with a telephone handset which has been designed to accommodate an internally mounted microphone without noise cancelling facility.

BACKGROUND OF THE INVENTION

Telephones having microphones fitted inside an apertured mouthpiece usually have no discrimination against background noise. Noise cancelling microphones are well known. They are sometimes also referred to as pressure gradient microphones and in their construction a vibratable diaphragm which is actuated by speech or other sounds is arranged such that sound paths are provided to both front and rear sides thereof to reduce the effect of unwanted background noise signals. Prior art microphones of this type are unsuitable to serve as direct replacements for conventional microphones inside the mouthpiece of telephone handsets because they are not adapted to work with existing apertures in the handset mouthpiece.

One solution to this problem is described in British Patent Application No. 8500854, Publication No. GB 2169774A. In this application, a noise cancelling microphone arrangement is disclosed which is constructed and arranged for securing to the external surface of the apertured mouthpiece region of a telephone handset without requiring modification to the handset.

SUMMARY OF THE INVENTION

It is an object of the present invention to provide a noise cancelling microphone for use inside the mouthpiece of an existing telephone handset without requiring modification to the handset.

The present invention provides a noise cancelling microphone for location inside a telephone handset at an internal surface of an apertured mouthpiece region thereof and incorporating a diaphragm and associated essential components for converting sound energy into electrical signals for transmission, said microphone comprising:

a housing having a face adapted to be secured in contact with the internal surface of the apertured mouthpiece region of the handset;

a cavity formed within the housing and accommodating the said diaphragm, said diaphragm being secured at its periphery inside the cavity;

a first sound path provided to a front surface of the diaphragm by way of an opening in a central region of said face of said housing;

a second sound path provided to a rear surface of the diaphragm by way of an opening in an outer region of said face of said housing, said first and second sound paths being physically separated from one another;

said microphone being adapted to be secured in contact with the internal surface of the apertured mouthpiece region of the handset such that one or more apertures in a central portion of the apertured mouthpiece region overlie and access the said opening in the central region of the said face of the housing and such that one or more apertures in an outer portion of the apertured mouthpiece region overlie and access the said opening in the outer region of the said face of the housing.

By means of the invention, separated sound paths are provided from the exterior of the mouthpiece region of the handset to the front and rear surfaces of the diaphragm. The separated sound paths to the diaphragm may be extended by providing, for securement externally on the apertured mouthpiece region of the handset, one or more upstanding members adapted to separate the said central portion of the apertured mouthpiece region of the handset from the said outer portion of the apertured mouthpiece region of the handset. One such upstanding member may, for example, comprise an open-ended hollow member arranged to surround the central portion of the apertured mouthpiece region of the handset. Where the apertures in the mouthpiece region are arranged in concentric circular pattern, the open-ended hollow member may conveniently be provided of cylindrical form, or in the form of a truncated cone whose truncated apex region is arranged to be secured to the mouthpiece region of the handset.

Alternatively, where the apertures in the mouthpiece region are in rectangular arrangement, an upstanding member of open-ended hollow rectangular form may be provided, or two or more wing-like members may be provided, extending from the external surface of the apertured mouthpiece region of the handset to separate the central and outer apertured regions.

The microphone is suitably adapted to be secured in contact with the internal surface of the apertured mouthpiece region of the handset by an adhesive or by clamping means.

Such clamping means may conveniently comprise one or more clips or threaded fasteners. If one or more threaded fasteners are employed, this or these may conveniently be passed through one or more of the apertures in the apertured mouthpiece region of the handset.

If required, a seal of a suitably shaped compliant material, such as a rubber or plastics material, may be provided between the microphone and the apertured mouthpiece region of the handset.

The said cavity is conveniently of hollow cylindrical form and suitably located concentrically with the housing, which may also conveniently be substantially cylindrical in shape.

The present invention also provides a telephone handset incorporating a noise cancelling microphone as described hereinbefore.

BRIEF DESCRIPTION OF THE DRAWING

The invention is now described by way of example with reference to the accompanying drawing which represents a cross-sectional view of an apertured mouthpiece region of a telephone handset to which is secured a noise-cancelling microphone according to the invention. In the drawing, certain electrical and mechanical components of the microphone have been omitted in the interest of clarity. Such components, although being essential to the basic operation of the microphone, are well-known in the art and not required for an understanding of the invention.

DETAILED DESCRIPTION OF PREFERRED EMBODIMENT

A telephone handset of conventional construction incorporates an apertured mouthpiece region 1 of known for. A noise cancelling microphone 2 is provided for mounting inside the handset and for securing in contact with the internal surface 3 of the apertured mouthpiece region 1. The microphone 2 comprises a housing 4, e.g., of cylindrical form, having a face 5 shaped to make good contact with the internal surface 3 of the mouthpiece region 1. A cavity 6, of hollow cylindrical form, is provided concentrically with the housing 4. The cavity is open at both ends and has a cylindrical boundary wall 7 extending to an opening 8 provided in a central region of the face 5 of the housing.

A vibratable circular diaphragm 9 of conventional well-known form, is accommodated in the cavity 6 and secured around its periphery directly or indirectly to the cylindrical boundary wall 7. The diaphragm 9 is arranged to be actuated by speech or other sounds applied to the mouthpiece region of the handset. The vibrations of the diaphragm are converted in well-known manner by means (not shown) into electrical signals for transmission from the handset. A first sound path is provided to a front surface 10 of the diaphragm by way of the opening 8 in the face 5 of the housing. A passageway 11 is provided leading from an opening 12 in an outer region of the face 5 of the housing and into the cavity 6 to a rear surface 13 of the diaphragm 9. A second sound path is thereby formed which leads to the rear surface 13 of the diaphragm 9 and is physically separated from the first sound path which leads to the front surface 10 of the diaphragm 9. The microphone 2 is secured in contact wth the internal surface 3 of the apertured mouthpiece region of the handset such that apertures 14 in a central portion of the mouthpiece region 1 overlie the opening 8 in the central region of the face 5 of the housing 4 and access the cavity 6 and provide sound paths from the exterior of the mouthpiece region only to the front surface 10 of the diaphragm 9.

Apertures 15 in an outer portion of the mouthpiece region 1 access the passageway 11 in the microphone 2 by way of the opening 12 in the outer region of the face 5 of the housing 4 and provide sound paths only to the rear surface 13 of the diaphragm 9 by way of the passageway 11. The microphone is secured to the handset by suitable means such as a film of adhesive applied at the face 5 of the housing 4. Alternatively, one or more threaded fasteners (not shown) could be used to effect the securement. This or these could conveniently be located through one or more of the apertures 15 in the mouthpiece region 1. As a further alternative, the microphone could be secured in position by means of clips or other convenient clamping means (not shown).

The arrangement results in sound paths to the front and rear surfaces of the diaphragm 9 which are entirely separated. To be fully effective, the face 5 of the microphone housing must be adequately sealed to the internal surface 3 of the mouthpiece region 1.

If necessary a seal (not shown) of a suitably shaped compliant material, such as a rubber or plastics material, can be provided at the interface between the microphone and the mouthpiece region.

The separated sound paths to the diaphragm may be extended by securing to an external surface 16 of the apertured mouthpiece region of the handset an upstanding open-ended hollow member 17 which is arranged to surround the apertures 14 at the central portion of the mouthpiece region of the handset and separate these apertures 14 from the apertures 15 at the outer portion of the mouthpiece region. When the apertures 14, 15 are arranged in concentric circular pattern, the member 17 is suitably provided in the form of a truncated cone and acts as a conical horn. When the handset is in use, the lips of a person speaking into it are close to the open end of the member 17 and a differential pressure is produced at the diaphragm 9 from close speech. Below a limiting frequency, distant sounds produce less differential pressure at the diaphragm and hence there is discrimination against background noise.

The member 17 may be provided of different forms and shapes according to the arrangement of the apertures 14 and 15 in the mouthpiece region 1.

Although it is preferable to provide the member 17, this is not always essential. The spherical form of sound waves produced by a person speaking closely into the mouthpiece of the handset provides a phase-related differential pressure between the apertures 14 in the central portion of the mouthpiece and the apertures 15 in the outer portion of the mouthpiece and limited discrimination can be achieved.

We claim:

1. A noise cancelling microphone for location inside a hollow microphone-containing portion of a telephone handset at an internal surface of an apertured wall of said containing portion, the whole of the outer surface of said wall being presented towards the mouth of the user when the handset is in use, said microphone comprising:

a housing having an open face adapted to be secured in contact with the internal surface of said apertured wall of the handset, said housing including an imperforate rear wall and imperforate side walls extending between said open face and said imperforate rear wall;

tubular means formed within said housing to define a cavity extending at one end from said internal surface of said apertured wall to an open end of said tubular means within said housing, said open end of said tubular means being spaced from said imperforate side walls and from the imperforate rear wall of said housing;

a diaphragm secured at its periphery inside said cavity for location substantially parallel to said internal surface of said apertured wall;

said cavity being defined for location in relation to a first opening in a central region of said apertured wall to provide a first sound path to a front surface of said diaphragm; and a second opening in said apertured wall outside said tubular means to provide a second sound path, separate from said first sound path, which extends between said tubular means and the imperforate side walls of said housing to the open end of said tubular means and thence to a rear surface of said diaphragm;

whereby, when the microphone is mounted in place, at least one opening in said apertured wall provides access to said front surface of said diaphragm and at least one further opening in said apertured wall provides access to said rear surface of said diaphragm.

2. A noise cancelling microphone for location inside a hollow microphone-containing portion of a telephone handset at an internal surface of an apertured wall of said containing portion, the whole of the outer surface of said wall being presented towards the mouth of the user when the handset is in use, said microphone comprising:

a housing having a face adapted to be secured in contact with the internal surface of said apertured wall of the handset;

tubular means formed within said housing to define a cavity extending at one end from said internal surface of said apertured wall to an open end of said tubular means within said housing;

a diaphragm secured at its periphery inside said cavity for location substantially parallel to said internal surface of said apertured wall;

said cavity being defined for location in relation to a first opening in a central region of said apertured wall to provide a first sound path to a front surface of said diaphragm;

said housing and said tubular means being formed in relation to a second opening in said apertured wall outside said tubular means to provide a second sound path separate from said first sound path to a rear surface of said diaphragm; and an upstanding member secured to the external surface of said apertured wall and formed to separate said central region of said apertured wall from an outer apertured region thereof to extend said separated sound paths toward the mouth of the user;

whereby, when the microphone is mounted in place, at least one opening in said central region of said apertured wall overlies and provides access to said one end of said cavity and at least one opening in said apertured wall outside said tubular means provides access to said open end of said tubular means.

3. A microphone according to claim 2 wherein said upstanding member comprises an open-ended hollow membre which surrounds said central region of said apertured wall.

4. A microphone according to claim 2 wherein said openings are arranged in a concentric circular pattern, said upstanding member being a truncated conical tube that enlarges in a direction away from said apertured wall, the central axis of said conical tube being concentric with said circular pattern of openings.

5. A microphone according to claim 2 wherein said housing is laterally of cylindrical shape, said tubular means being of cylindrical form for disposition in coaxial relation with said cylindrical housing.

6. A telephone handset incorporating a noise cancelling microphone according to claim 2.

* * * * *